United States Patent [19]

Schuöcker et al.

[11] Patent Number: 4,566,077

[45] Date of Patent: Jan. 21, 1986

[54] DEVICE FOR THE EXECUTION OF A SCALAR MULTIPLICATION OF VECTORS

[75] Inventors: Dieter Schuöcker, Vienna, Austria; Ekkehard Klement, Munich, Fed. Rep. of Germany

[73] Assignee: Siemens Aktiengesellschaft, Berlin & Munich, Fed. Rep. of Germany

[21] Appl. No.: 552,772

[22] Filed: Nov. 17, 1983

[30] Foreign Application Priority Data

Nov. 19, 1982 [DE] Fed. Rep. of Germany ....... 3242818

[51] Int. Cl.⁴ ......................... G06G 9/00; G06G 7/16; G06F 7/56

[52] U.S. Cl. ................................... 364/845; 364/713; 364/841

[58] Field of Search ................ 364/800, 807, 821–822, 364/841, 845, 861, 713, 715, 606, 703, 754, 758; 350/169, 320–321; 356/72–73

[56] References Cited

U.S. PATENT DOCUMENTS

| | | | |
|---|---|---|---|
| 3,305,669 | 2/1967 | Fan | 364/845 X |
| 3,384,739 | 5/1968 | Connelly | 364/845 X |
| 3,497,717 | 2/1970 | Barber | 364/845 X |
| 3,525,860 | 8/1970 | Barber | 364/845 X |
| 3,652,162 | 3/1972 | Noble | 364/822 X |

FOREIGN PATENT DOCUMENTS

| | | | |
|---|---|---|---|
| 0698016 | 11/1979 | U.S.S.R. | 364/845 |
| 0702387 | 11/1979 | U.S.S.R. | 364/845 |

*Primary Examiner*—Gary V. Harkcom

*Attorney, Agent, or Firm*—Hill, Van Santen, Steadman & Simpson

[57] ABSTRACT

A device for executing a scalar multiplication of vectors is constructed in the form of an interferometric adder for residue numbers. A plurality of series-connected, vector-component-controlled phase modulators are disposed in each of the phase-modulatable light beams existing for such adder. A phase modulator is provided for each component of a vector, and which generates a phase shift as a function of the components of the vectors to be multiplied which are supplied to it. This phase shift is proportional both to the component of the one as well as to the component of the other vector. The phase shift generated by each component amounts to $2\pi$ when the numerical value of the component is divisible by the corresponding module without remainder. The result of the scalar multiplication is derivable as a positionally notated number from the interference pattern or interference patterns produced after the radiation through the phase modulators.

11 Claims, 8 Drawing Figures

DEVICE FOR THE EXECUTION OF A SCALAR MULTIPLICATION OF VECTORS

CROSS-REFERENCE TO RELATED APPLICATION

This application is related to U.S. application Ser. No. 386,902, filed June 10, 1982 of the same inventors, and currently pending.

BACKGROUND OF THE INVENTION

The present invention relates to a device for the execution of a scalar multiplication of vectors.

SUMMARY OF THE INVENTION

An object of the present invention is to create a device for the execution of a scalar multiplication of vectors which works extremely fast and which is nonetheless relatively simply constructed.

This object is resolved by means of an interfero-metric adder means for residue numbers formed of a plurality of modules. A respective phase-modulatable light beam is provided for each module intended for residue representation. The light beam produces an interference pattern in an allocated reference surface with a reference beam allocated to a respective phase-modulatable light beam. An angle of incidence relative to the reference surface of a phase-modulatable light beam and of the corresponding reference beam, or a wavelength of the pair of associated light beams, are selected such that a strip spacing of the interference pattern produced by the light beam pair in the allocated reference surface corresponds to the module allocated to this light beam pair. A plurality of series-connected vector-component-controlled phase modulator means are disposed in each of the phase-modulatable light beams. One phase modulator means is provided for each component of a vector. The phase modulator means produces a phase shift which is a function of components of the vectors to be multiplied which are supplied to it. Phase shift is proportional both to the components of the one as well as to the components of the other of the vectors to be multiplied. The phase shift produced by each component amounts to $2\pi$ when a numerical value of the component is divisible by the allocated module without remainder. With the invention, a result of the scalar multiplication may be obtained as a positionally notated number from the interference pattern or interference patterns generated after radiation through the phase modulator means.

An interferometric adder for residue numbers is proposed in the earlier German patent application No. P 32 25 404.0, incorporated herein by reference. The functioning of such an interferometric adder is also disclosed in that application and is described below in FIGS. 1-6.

DESCRIPTION OF THE PREFERRED EMBODIMENTS

The Co-Pending German Application Disclosure

Prior to describing the invention herein, selected portions of the aforementioned German application No. P 32 25 404.0 are set forth hereafter with reference to FIGS. 1-6.

An optical arithmetic unit and a device for the conversion of residue numbers into position-noted numbers are discussed hereafter.

An alternative to binary representation of data currently employed in electronic computers is the residue representation of said data. Given this technique, no carry-over between the places occurs and the calculations can therefore be carried out significantly faster. Given residue representation (see for example, Applied Optics 18 (1979), pp. 149-162, incorporated herein by reference), a plurality of modules $M_i$, $i=1, 2, 3, \ldots N$ are employed which must be primary numbers. One obtains the residue representation of a given number Z when it is divided by each of the primary number modules $M_i$. The remainders $R_i$, the residues, remaining in this division then represent the representation of the number Z in the system of the N primary number modules and this representation is referred to below as residue number. The highest number $Z_{max}$ unequivocably representable by a residue number results from the product of all employed primary number modules:

$$Z_{max} = \pi_{i=1}^{N} M_i$$

As already mentioned, residue representation exhibits the great advantage that no carry must be undertaken between the individual places since only the remainders, but not the absolute values of the places, need be retained in the arithmetic operations.

Moreover, all places can be processed in parallel, whereby a significant increase of the computational speed can be achieved in comparison to binary algebra.

Figure 1:
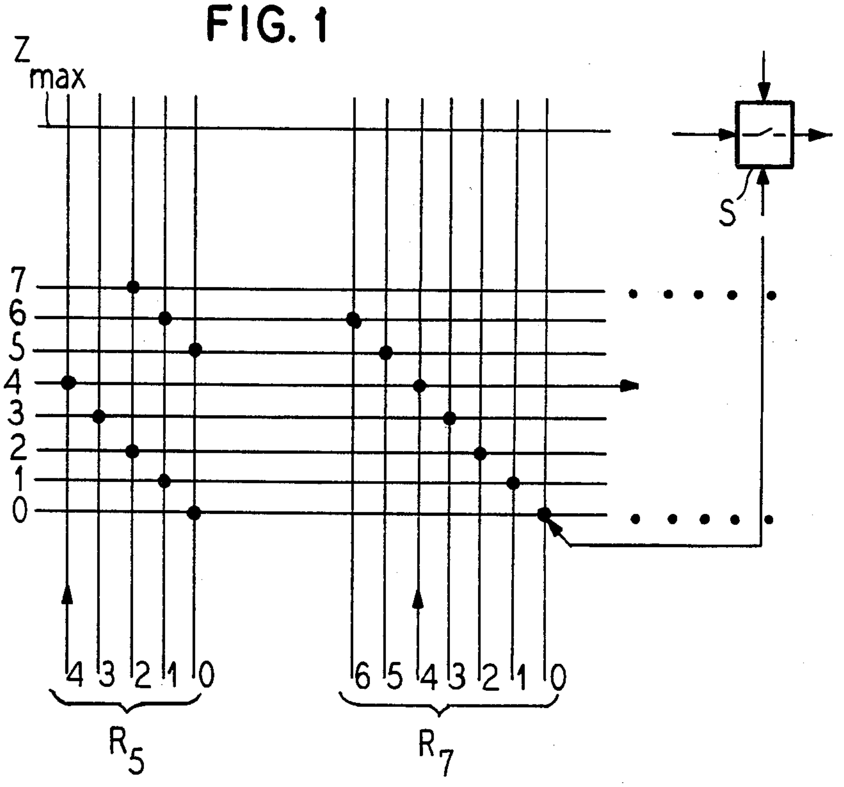
FIG. 1 is a section of a device which is suitable for the conversion of residue numbers into positionally noted numbers but which, however, is difficult to realize in practice.

First, the conversion of residue numbers into positionally noted decimal numbers will be discussed. The conversion of residue numbers $R_1 \ldots R_n$ into decimal numbers Z given by position notation, can fundamentally occur by means of a rectangular matrix consisting of light paths. Such a matrix is schematically illustrated in FIG. 1 in which the horizontal as well as the vertical lines respectively denote light paths. The horizontal lines represent the decimal numbers. Groups of vertical lines represent the residues. Each group of vertical lines represents one module $M_i$ and exhibits precisely $M_i$ vertical lines.

When a switch in the horizontal line is actuated by the vertical line at those intersections of lines and wherein the equation $Z_n = nM_i + R_i$, i=1, 2, . . . , N, is satisfied, then the activation of those vertical lines which correspond to the existing residue values causes all switches which lie in those horizontal lines for which $Z_n = nN_i + R_i$ is valid to be closed in each group of vertical lines. That horizontal line in which all switches are closed then corresponds to the resulting decimal number which fulfills all equations $Z = n_1M_1 + R_1 = n_2M_2 + R_2 = \ldots = NM_N + R_N$.

Only an excerpt from a complete matrix is illustrated in FIG. 1, namely, only the horizontal lines which indicate the positionally noted numbers 0 through 7 and, at the upper end, the maximum positionally noted number $Z_{max}$ as well. Of the groups of vertical lines, only two groups are illustrated which are allocated to the two primary number modules $M_5=5$ and $M_7=7$. The group allocated to the primary number module 5 has five vertical lines which are allocated to the five possible residues 0 through 4. The group belonging to the primary number module 7 has seven vertical lines which are allocated to the seven possible residues 0 through 6. An intersection emphasized with a black dot indicates that a switch element is provided at this location. This switch element is driven open and shut via the vertical line and interrupts or closes the horizontal line. Such a switch element is schematically illustrated in FIG. 1 and is referenced S.

When, for example, the binary numbers with sixteen places standard in electronic data processing are to be processed in residue representation, the matrix just described must comprise approximately 64,000 horizontal lines but only approximately 100 vertical lines. The resolution of the problem of packing that many light conductors in an optical component does not yet seem possible with the technology of integrated optics presently available. The required switch elements cannot be packed in such a high number, particularly because purely optical switches do not exist. Rather, one must utilize opto-electronic functions. Apart from that, the combined packing of such a large number of lines in a tight space has substantial problems associated therewith.

These problems can be eliminated as described below. It is important to perceive that the positionally noted numbers, for example, decimal numbers as in FIG. 1, can, instead of parallel lines, be represented by a plurality of periodic, linear structures with period lengths which are respectively proportional to a primary number module $M_i$. The linear structures, for example, may be linear structures with periodic marks whose spacings are respectively proportional to a primary number module $M_i$.

Figure 2:
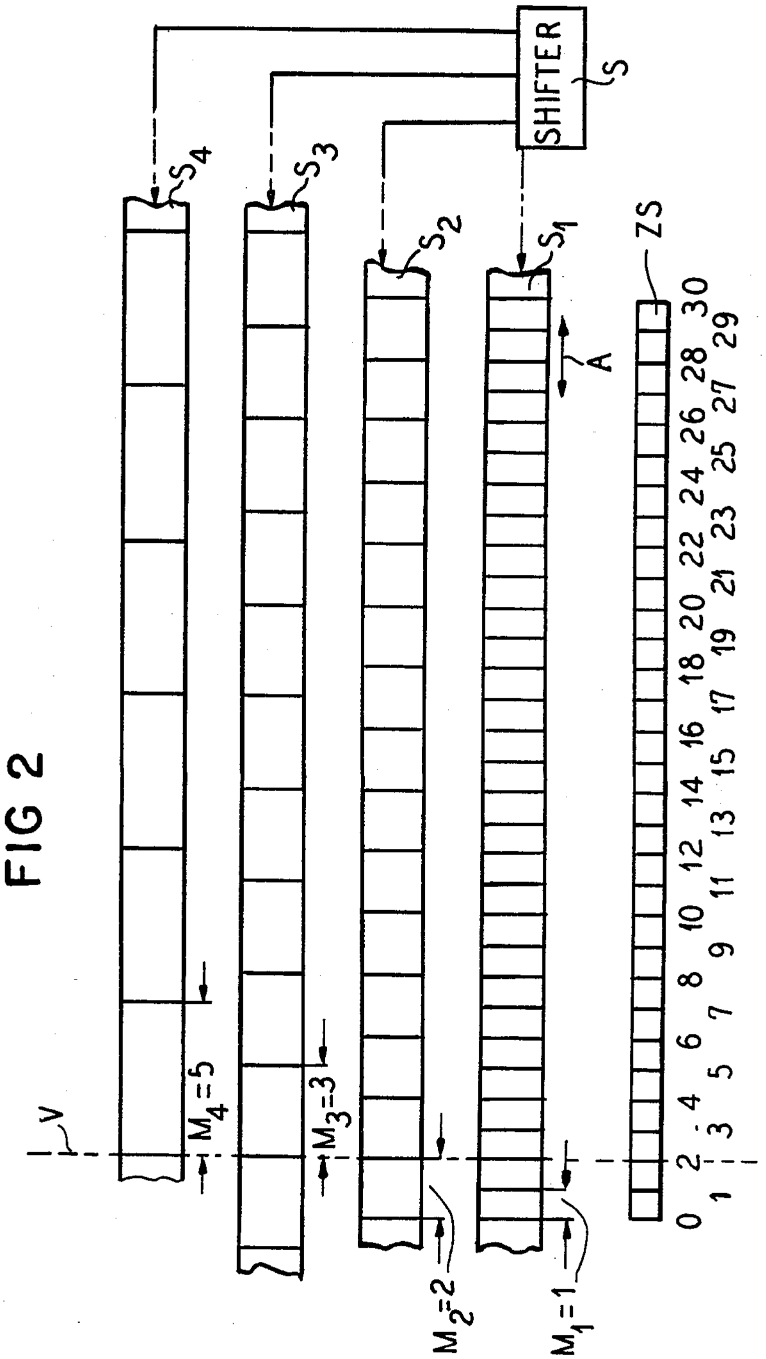
FIG. 2 is a schematic illustration of an embodiment of a device for the conversion of residue numbers into positionally noted numbers.

FIG. 2 shows a schematic illustration of an embodiment of such a device. It is presumed given this device that the residue representation occurs with the primary number modules 1, 2, 3 and 5. The maximum number which can be unequivocably represented is then given by $Z_{max}=30$.

The numbers 0 through 30 are positionally noted on a linear scale at the bottom of FIG. 2. Four periodic linear structures $S_1$, $S_2$, $S_3$ and $S_4$ are disposed over the linear scale and parallel thereto, and are shiftable relative to one another and along the linear scale, i.e. in the direction of the double arrow A.

The structures $S_1$ through $S_4$ exhibit respective equidistant marks. The mark spacing of the structure $S_1$ corresponds to the primary number module $M_1$, and thus the unit given by the scale. The mark spacing of the structure $S_2$ corresponds to the primary number module $M_2$, and thus to double the unit. The mark spacing of the structure $S_3$ corresponds to the primary number module $M_3$ and thus to triple the unit. Finally, the mark spacing of the structure $S_4$ corresponds to the primary number module $M_4$ and thus to five times the unit.

Given the device just described, in order to convert a given residue number into a positionally noted number, one proceeds in such a manner that the four structures $S_1$ through $S_4$ are brought into a position such that marks of all structures over the positionally noted zero lie above one another, i.e. lie on a vertical line through the positionally noted zero. Proceeding from this zero position, each structure is shifted toward the right to such a degree as is specified by the residue allocated to its primary number module. The location at which the marks of all structures, i.e., a total of four marks, lie above one another and thus lie on a vertical line, indicates the positionally noted number belonging to the corresponding residue number. In FIG. 2, the positionally noted numeral 2 is indicated, because precisely four marks lie on a vertical line V proceeding through the positionally noted numeral 2. Line V is indicated as a broken line.

Given the primary number modules $M_1=1$, $M_2=2$, $M_3=3$ and $M_4=5$, then: $2 = 2 \cdot M_1 + 0 = 1 \cdot M_2 + 0 = 0 \cdot M_3 + 2 = 0 \cdot M_5 + 2$, i.e. given this residue representation, 2 is represented by the residue number (0, 0, 2, 2). This means that the structures $S_1$ and $S_2$ are not to be shifted out of their zero position, whereas the structures $S_3$ and $S_4$ are to be shifted two units toward the right. When this is carried out, then the configuration illustrated in FIG. 2 results.

A practical realization of the device illustrated in FIG. 2 is, for example, the superimposition of linear perforated masks in which each mark is represented by a hole or window. A location is where all marks or holes coincide after the shifts undertaken as a result of the prescribed residue number thus identifies the allocated positionally noted number.

Since such a device functions essentially mechanically, it is not useful for arithmetic units which function in a rapid manner.

Periodic structures can also be generated by means of interference, for example, by means of double-beam interference in which the superimposition of two planar light waves whose propagation directions describe an angle produces an amplitude distribution corresponding to a standing wave in a plane which is perpendicular to both propagation directions. The spacing $\Gamma$ of the interference strips is given by the wavelength $\lambda$ and the angle $\alpha$ between the two propagation directions. The spacing is defined as:

$$\Gamma = \frac{\lambda}{2} \; \frac{1}{\sin(\alpha/2)\cos\beta}.$$

This spacing becomes very large given small angles $\alpha$. $\beta$ is the angle between the observation plane and the normal on the angle bisector of $\alpha$.

The shift of the interference strips necessary for the representation of the individual residue values can be generated by means of a phase modulator which shifts the phase position of one of the two beams.

Since such an interference pattern must be generated for each of the primary number modules employed in the residue representation, and since the strip spacing of the interference pattern is proportional to the allocated module, one must work with a corresponding number of differently directed light beams.

Figure 3:
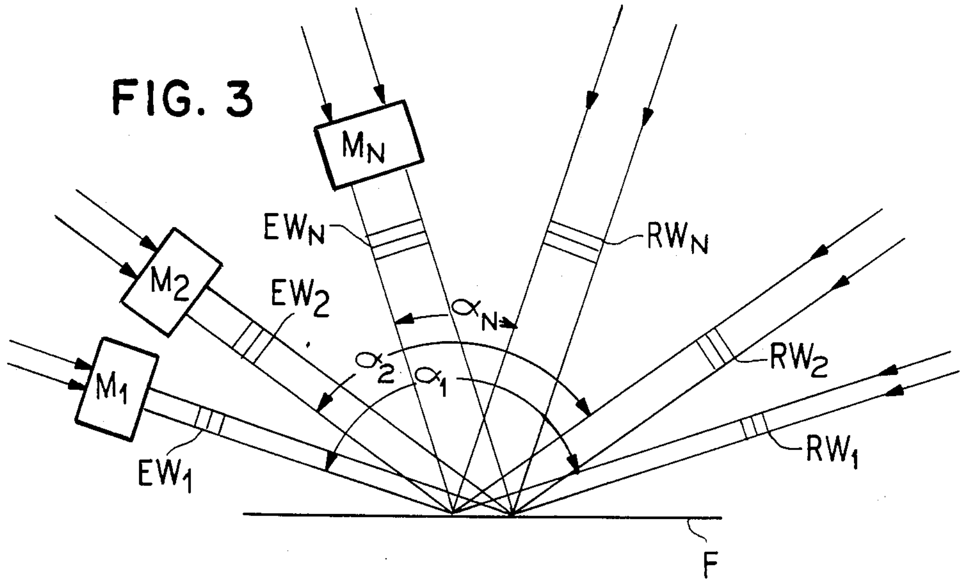
FIG. 3 is a schematic illustration of another device according to FIG. 2 in which periodic structures are realized by means of interference patterns.

FIG. 3 schematically shows such a device for residue numbers which is based on N modules $M_1, M_2, \ldots M_N$. In order to generate the N interference patterns required therefor, N planar waves $EW_1, EW_2, \ldots, EW_N$ are employed which interfere with reference waves RW at N different angles $\alpha_1, \alpha_2, \ldots \alpha_N$. Thus, a resultant interference pattern is formed in a plane which is perpendicular to a plane coinciding to the plane of the drawing in FIG. 3 and contains all propagation directions, the interference pattern corresponding to the coherent superimposition of 2N waves. A screen F is disposed in the plane in which the resulting interference pattern arises. Each of the planar waves $EW_1, EW_2, \ldots, EW_N$ traverses a respective phase modulator $M_1, M_2, \ldots, M_N$, with which the phase position of the corresponding wave can be shifted.

When the phase positions of the N incident waves are shifted in accordance with the N given residue values, then the strips of the N interference patterns are likewise shifted on the screen F and, on a linear scale associated therewith, the positionally noted number corresponding to the residue values can be read at the single location where all N interference patterns exhibit a common maximum.

The device according to FIG. 3 can also be realized by means of integrated optics, for example, by means of N strip-shaped light waveguides which proceed at N acute angles $\alpha_1, \alpha_2, \ldots, \alpha_N$ relative to a reference waveguide, and in which a respective modulator is disposed.

Figure 4:
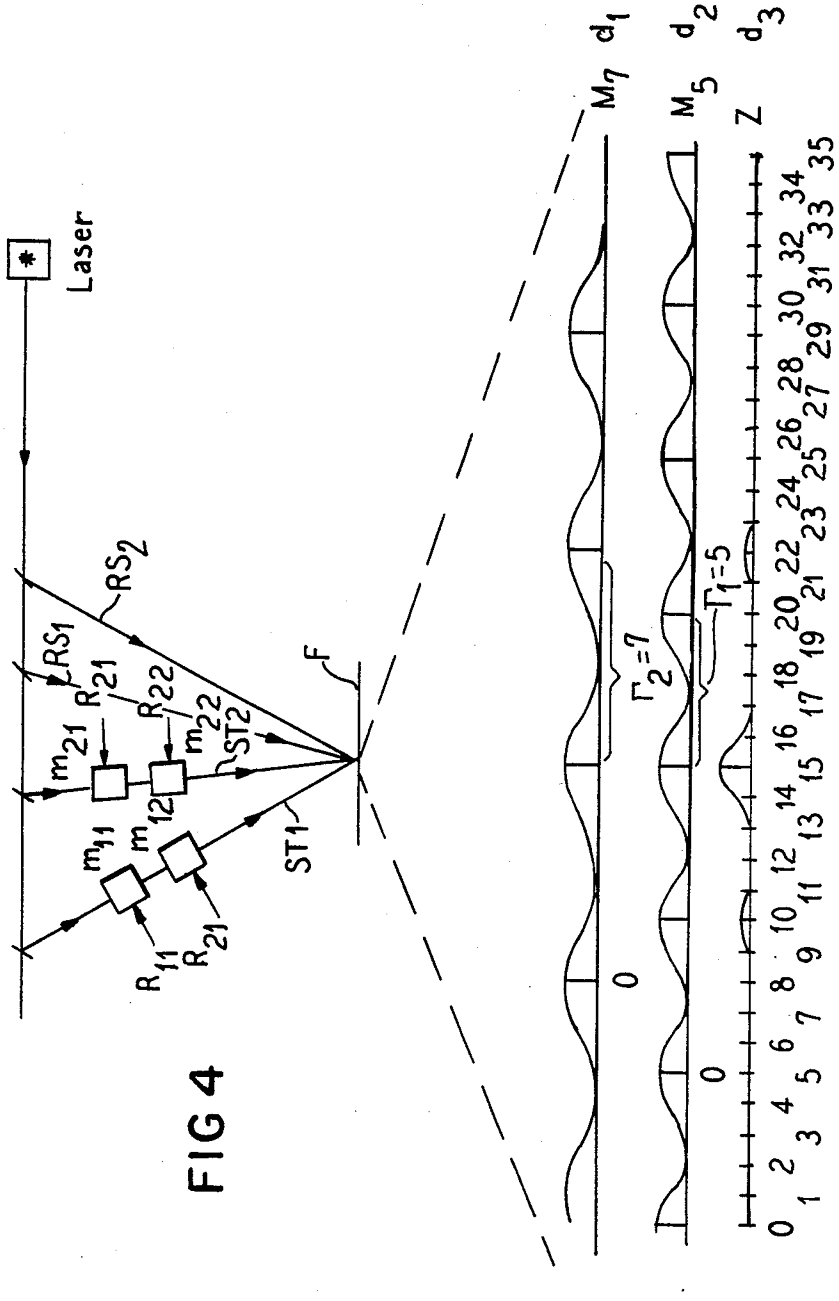
FIG. 4 shows an adder which is essentially constructed like the device according to FIG. 3.

FIG. 4 shows an optical adder which corresponds to a device according to FIG. 3 and, accordingly functions according to interference principles.

Given this adder, the reference beams RS and $RS_2$, a first beam ST1, and a second beam ST2 which are branched off from a laser beam with the assistance of semi-reflective mirrors, are brought to interference on a screen F. Two phase modulators $m_{11}$, $m_{12}$ are positioned in series in the first beam ST1 and two phase modulators $m_{21}$ and $m_{22}$ are positioned in series in the second beam ST2.

It is thus assumed that two modules $M_5=5$ and $M_7=7$ are employed for the residue representation. Thus, $Z_{max}=35$.

Two residue numbers $(R_{11}, R_{12})=(1, 6)$ and $(R_{21}, R_{22})=(4, 2)$ are to be added. These two residue numbers are the residue representation of the two decimal numbers 6 or 9, respectively.

In FIG. 4 interference patterns are schematically illustrated over a scale below the screen F, on which scale the numbers 0 through 35 are equidistantly provided. For clarification, the occurring secondary lobes have been omitted. The diagram $d_1$ corresponds to an interference pattern which is generated on the screen F by the beam ST2 and the reference beam $RS_2$. The strip spacing $\Gamma_2$ of said interference pattern allocated to the module $M_7$ amounts to seven scale units. The two modulators $m_{21}$ and $m_{22}$ effect a phase shift which corresponds to $R_{12}+R_{22}$. Given the specified numerical example, this corresponds to eight scale units. This means that the phase position of the interference pattern $d_1$ is shifted eight units toward the right. The original phase lying at zero is characterized by a 0.

The interference pattern generated by the beam ST1 and the reference beam $RS_1$, and which is allocated to the module $M_5$, is illustrated in diagram $d_2$. Given this pattern, the strip spacing $\Gamma_1$ corresponds to five scale units. The modulators $m_{11}$ and $m_{12}$ shift the phase position of the interference pattern $d_2$ toward the right by $R_{11}+R_{21}$. This corresponds to $1+4=5$ scale units. In this interference pattern, the phase originally lying at 0 is identified by a 0.

In the two diagrams $d_1$ and $d_2$, the intensity maximums are identified by the equidistant vertical strokes. One can determine from the two diagrams that the maximums of both interference patterns coincide at the number 15. That means that the actual interference pattern which is generated by all three beams on the screen F must exhibit a clear intensity maximum there. In diagram $d_3$, this maximum is likewise identified by a vertical stroke. Since the two residue numbers correspond to the decimal numbers 6 and 9, the sum of the residue numbers must correspond to the decimal number $9+6=15$, which is indeed the case.

Thus, the adder illustrated in FIG. 4 is an optical arithmetic unit at the same time which processes residue numbers and supplies the results in a differently encoded form. Thus, given such an arithmetic unit, the arithmetic element which processes the residue numbers and the device for converting the residue numbers into differently encoded numbers form a unit.

It should be noted that the adder illustrated in FIG. 4 only represents a specified example and that such an adder, however, can also be realized by means of the device generally illustrated in FIG. 2 or by means of a corresponding adder.

A significant advantage of such an arithmetic unit is its considerable speed.

Figure 5:
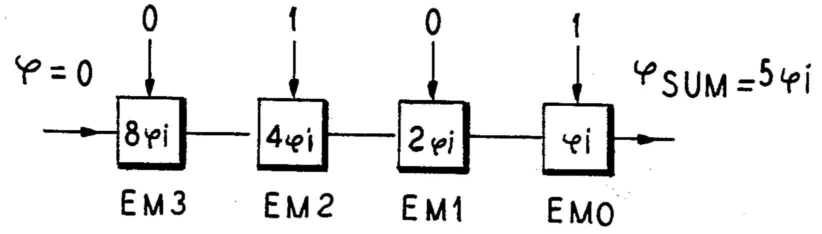
FIG. 5 shows a device for conversion of a binary number into a phase change corresponding to the value of said binary number.

FIG. 5 shows a device for the conversion of a binary number into a phase change in a laser beam radiating thereon, said phase change corresponding to the value of said binary number. Every phase modulator which is to convert a residue of a residue number into a corresponding phase shift, namely, each of the phase modulators $M_1, M_2, \ldots, M_N$ of the device according to FIG. 3 and of the phase modulators $m_{11}, m_{12}, m_{21}, m_{22}$ of the adder according to FIG. 4, can be a phase modulation device according to FIG. 5.

A respective individual phase modulator is provided in the device according to FIG. 5 for each binary place of the binary number and these individual modulators are positioned behind one another in the beam path. Each of these individual modulators effects a specific phase shift only when its binary place exhibits the binary value 1. When the binary value is 0, no phase change occurs. The individual modulator which is allocated to the least significant binary or dual place of the binary number generates a pre-settable phase shift $\phi_i$ when this place has the value 1. The individual modulator which is allocated to the $j^{th}$ $(j=1, 2, \ldots, n)$ binary place of the binary number must produce a phase shift which is equal to $2^j \cdot \phi_i$.

Given the device according to FIG. 5, a four-place binary number forms the basis and accordingly four individual modulators $EM_0$ through $EM_3$ are provided. The four-place binary number is supplied to the modulators in parallel. The phase shift which each of these four individual modulators $EM_0$ through $EM_3$ is to produce when the value of the place allocated to it is 1 is entered in each individual modulator in FIG. 5. When, for example, the binary number 0101 is supplied, then the individual modulator $EM_0$ produces the phase shift $\phi_i$ and the individual modulator $EM_2$ produces the phase shift $2^2 \cdot \phi_i = 4\phi_i$. The two individual modulators $EM_1$ and $EM_3$, of which the former would produce the phase shift $2^1 \cdot \phi_i = 2 \cdot \phi_i$ and the latter would produce the phase shift $2^3 \cdot \phi_i = 8\phi_i$, produce no phase shift because the value of their binary place is 0. Thus, overall a phase shift $\phi_{sum} = 5\phi_i$ is produced.

Figure 6:
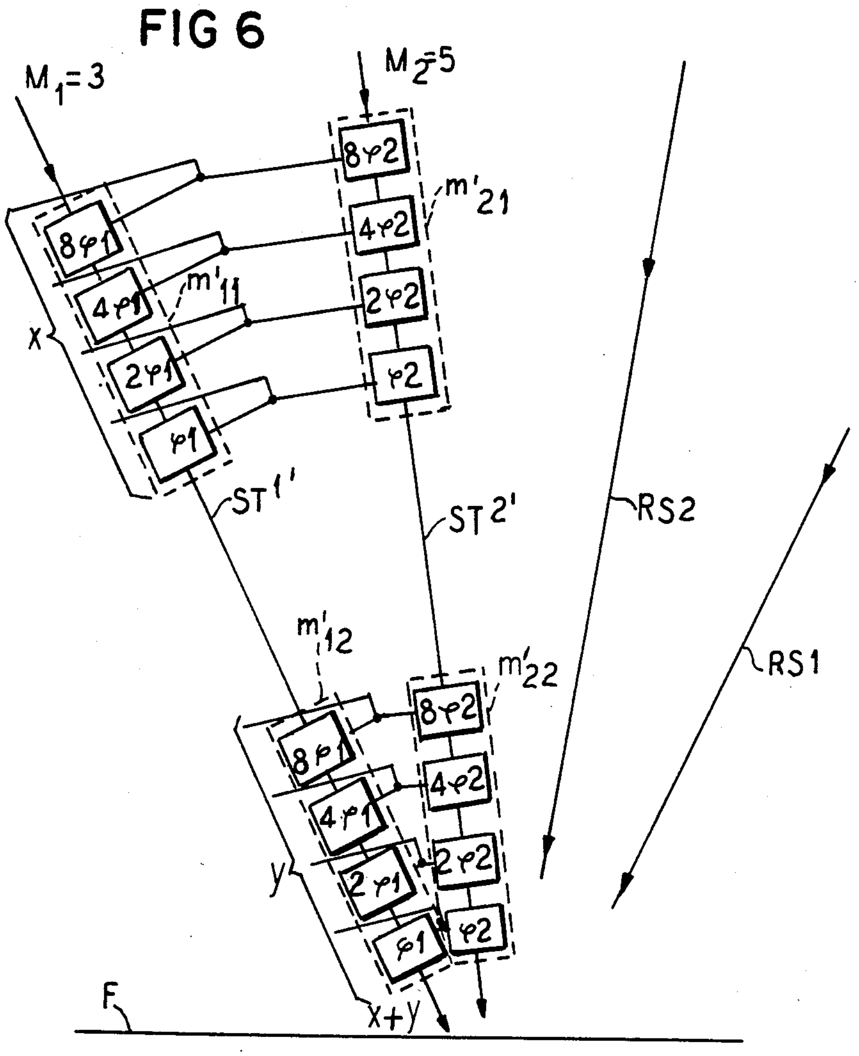
FIG. 6 shows an optical adder for binary numbers which outputs the result as a position-notated number.

An optical adder for binary numbers which outputs the result as a position-notated number is illustrated in FIG. 6. This adder functions according to the interference principle and is similarly constructed in a certain way to the adder according to FIG. 4 for the addition of residue numbers.

The adder according to FIG. 6 is based on two modules $M_1=3$ and $M_2=5$. A laser beam ST1' is allocated to the module $M_1$, said laser beam ST1' radiating on two phase modulators $m'_{11}$ and $m'_{12}$. Said laser beam ST1' interferes with a reference beam RS1 so that an interference pattern is generated in a reference plane F. A second laser beam ST2' is allocated to the module $M_2=5$ and this likewise radiates on two phase modulators $m'_{21}$ and $m'_{22}$. Said second laser beam ST2' interferes with a second reference beam RS2 so that a second interference pattern arises in the reference plane F, this being superimposed on the first described interference pattern. The employment of two reference beams here also only serves to more clearly emphasize the absolute maximum in the resulting interference pattern. The angles of incidence of a laser beam ST1' or ST2', and of the reference beam RS1 or RS2 allocated to it are again to be selected such that the strip spacing of the interference pattern produced by said beam pair corresponds to the module $M_1=3$ or $M_2=5$ allocated to it.

A significant difference between the adder according to FIG. 6 and the adder according to FIG. 4 is that given the adder according to FIG. 6, the phase modulators $m'_{11}$, $m'_{21}$ or $m'_{12}$ and $m'_{22}$ in the two laser beams ST1' and ST2' which are allocated to the addends x or y, have the same number, namely the addend x or y supplied to them. Given the adder according to FIG. 4, in contrast thereto different numbers, namely residues, are generally supplied to the corresponding phase modulators. Given this adder, thus the addends must first be converted into residue numbers.

Basically, the calculator according to FIG. 6 likewise adds residue numbers, but these do not appear at the outside. The necessary conversion of the addends into residue numbers is achieved in an extremely simple manner in that the phase shift of the phase modulators is correctly set as a function of the modules allocated to them. The smallest phase shift which corresponds to the number 1 is selected such that the number which corresponds to the allocated module precisely produces a phase shift of $2\pi$. This is true independently of the numerical system in which the addends are represented.

In the example of FIG. 6, the smallest phase shift $\phi_1 = 2\pi/3$ would have to be selected for the phase modulators $m'_{11}$ and $m'_{12}$, whereas the smallest phase shift $\phi_2$ for the two other modulators $m'_{21}$ and $m'_{22}$ is to be selected $\phi_2 = 2\pi/5$. In general, the smallest phase shift is to be selected equal to $2\pi$ divided by the allocated module. In this manner, the same number, namely the addend, can be supplied to each phase modulator which is allocated to a specific addend, and the conversion of this number into the residue representation inherently occurs.

As already mentioned, the adder according to FIG. 6 is an adder for binary numbers, namely for four-place binary numbers. For this reason, each of the phase modulators $m'_{11}$, $m'_{12}$, $m'_{21}$ and $m'_{22}$ consists of a device according to FIG. 5 and the addends x and y are supplied in parallel in the form of four-place binary numbers.

THE PRESENT INVENTION

Figure 7:
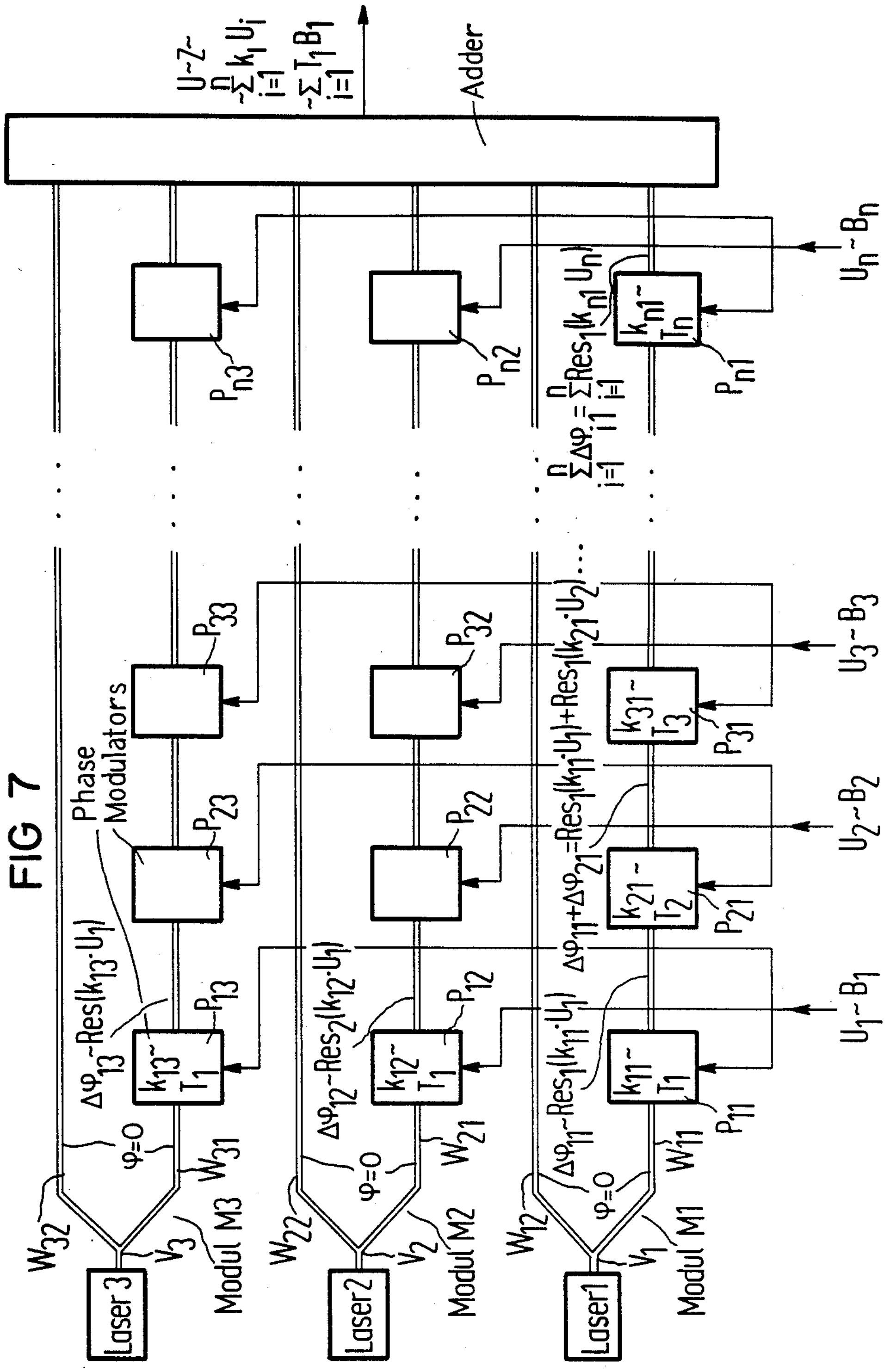
FIG. 7 schematically illustrates an embodiment of a device of the invention for the execution of a scalar multiplication of two vectors T and B.

According to FIG. 7, each phase modulator belonging to a specific module $M_j$ of the modules $M_1$, $M_2$, . . . , $M_j$ . . . $M_N$ employed for the residue representation and associated with the interferometric adder proposed in the earlier patent application must be replaced by n phase modulators $P_{ij}$ connected in series for the formation of the scalar product of the two vectors $B=(B_1, B_2, B_3, \ldots, B_n)$ and $T=T_1, T_2, T_3, \ldots, T_n)$. The n.N phase modulators (specifically in FIG. 1, N=3) are combined in n disjunctive groups of N respective phase modulators of which each one belongs to a different module. A respective vector component pair of the two vectors B and T is allocated to each of the groups, and each phase modulator generates a phase shift which is proportional both to the one as well as to the other component of the vector pair allocated to it.

A phase modulator is designed such that it generates the phase shift $2\pi$ when a vector component allocated to it has the value of the module allocated to it. When this is the case, then the phase shift produced by the phase modulator is proportional to the residue Res of the product of the two vector components allocated to the phase modulator.

When a phase-modulatable light beam traverses the n phase modulators allocated to a module and dimensioned in the manner specified above, the n component pairs $B_i \cdot T_i$ required for the formation of the scalar product are allocated in inverted fashion to the n phase modulators. Then the phase shift behind the last phase modulator crossed corresponds to the sum of the residues of the products formed from the individual component pairs.

All of these phase shifts for all N modules correspond to the residue representation of the scalar product of the two vectors B and T to be calculated.

The conversion of this residue representation into a decimal number can be achieved since each of the phase-modulatable light beams is caused to interfere with the reference beam allocated to it, and the interference pattern or the interference patterns produced are evaluated in such manner that the decimal number is displayed as a positionally noted number. Details concerning this are specified in the aforementioned earlier patent application incorporated by reference herein and this is therefore not discussed in greater detail here.

Specifically in FIG. 7, the component pairs $B_i$ and $T_i$, $i=1, 2, \ldots, n$ are allocated to the phase modulator groups having the phase modulators $P_{ij}$, $j=1, 2, \ldots, N$. Each of these phase modulators $P_{ij}$ generates a phase shift $\Delta\phi_{ij}$ which is proportional to the product $B_i \cdot T_i$ and which depends on the allocated module $M_j$. According to the dimensioning rule for the phase modulators specified above, this phase shift $\Delta\phi_{ij}$ is proportional to $Res_j (B_i \cdot T_i)$, i.e. to the residue of the product $B_i \cdot T_i$ which is allocated to the module $M_j$.

Since, as already mentioned above, the phase shifts successively generated by the phase modulators $P_{1j}$, $P_{2j}$, . . . , $P_{nj}$ belonging to a module $M_j$ add up to $$\sum_{i=1}^{n} \Delta\phi_{ij},$$

then a phase shift which corresponds to $$\sum_{i=1}^{n} Res_j(B_i \cdot T_i)$$

is obtained behind the last phase modulator $P_{nj}$.

After evaluation of the interference pattern or the interference patterns, a decimal number Z results which is proportional to the scalar product of the two vectors B and T: $Z=B_i \cdot T_i$.

Suitable for the realization of the phase modulators $P_{ij}$ is a material whose refractive index is variable by means of applying a field strength, particularly the electric field strength. In this case, the phase shifts can be generated by means of applying voltages. For example, the material can be disposed between electrodes across which the voltage set according to one or both of the prescribed components is applied.

Figure 8:
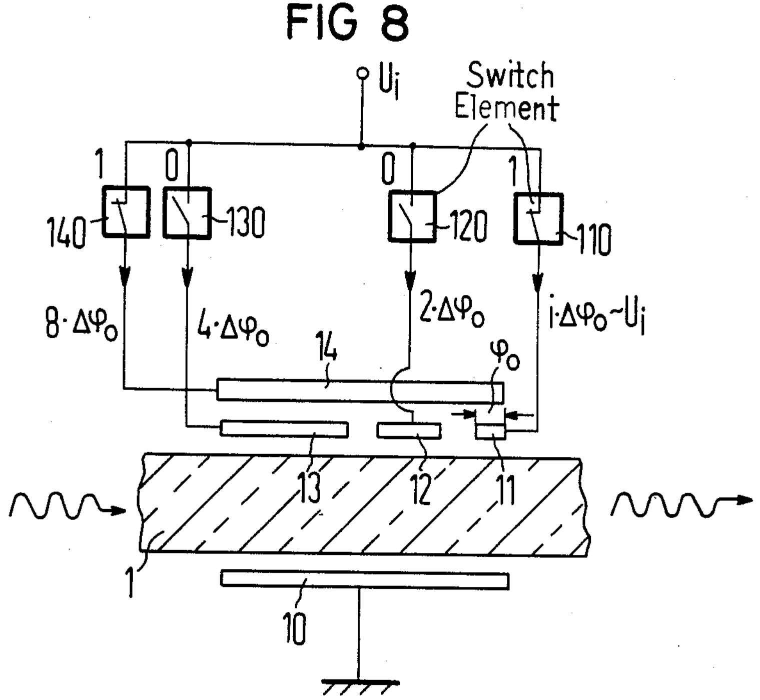
FIG. 8 is a schematic illustration of a realization of a phase modulator according to the invention of the embodiment according to FIG. 7.

An embodiment of such a modulator is illustrated in FIG. 8, wherein one of the two vector components to be linked can be input as a binary number, whereas the other component is applied in the form of a variable voltage $U_i$.

In FIG. 8, 1 indicates a material having a refractive index dependent on the electric field strength in the form of a planar waveguide which is disposed between a grounded cooperating electrode 10 and four control electrodes 11, 12, 13, and 14. The shortest control electrode 11 exhibits a length $L_O$ in the propagation direction of the phase-modulatable light beam conducted by the waveguide 1. The control electrode 12 is twice as long as the electrode 11; the control electrode 13 is again twice as long as the electrode 12; and finally the longest control electrode 14 is twice as long as the control electrode 13.

For space saving reasons, the longest control electrode 14 is disposed above the other three control electrodes positioned behind one another in the propagation direction of the light.

Each of the control electrodes 11 through 14 is connected to the variable voltage $U_i$ over a respective switch element 110, 120, 130 or 140. Each of the switch elements 110 through 140 can be engaged and disengaged by means of a respective binary electric signal so that the voltage $U_i$ can be selectively applied to the corresponding control electrode.

The phase shift effected by a control electrode given a voltage $U_i$ depends on the length of the electrode. When the shortest control electrode 11 generates a phase shift $\Delta\phi_o$ given the voltage $U_i$, then the electrode 12, 13, 14 effects a phase shift of $2 \cdot \Delta\phi_o$, $2^2 \cdot \Delta\phi_o$ or $2^3 \cdot \Delta\phi_o$. Accordingly, the places $2^0$, $2^1$, $2^2$, $2^3$ of a four-place binary number are allocated to the electrodes 11 through 14. Thus, when the switch elements 110 through 140 are controlled in accordance with a binary number which corresponds to a vector component, for example the vector component $T_i$, then a phase shift proportional to said component is produced. In the example of FIG. 8, it is assumed that the binary number 1001 is present in parallel at the switch elements 140 through 110, whereby a binary 1 denotes a closed switch element and a binary 0 denotes an open switch element. This binary number corresponds to the phase shift $9 \cdot \Delta\phi_o$.

However, the phase shift $\Delta\phi_o$ is also proportional to the applied voltage $U_i$. Thus, when the voltage $U_i$ is selected proportional—in a suitable manner—to the other vector component $B_i$ to be applied, then a phase shift also proportional to this other vector component is obtained.

The phase modulator according to FIG. 8 is a realization of a phase modulator $P_{ij}$ as employed in the embodiment according to FIG. 7. These phase modulators realize proportionality constants $k_{ij}$ which link the j voltages $U_i$ applied in fixed fashion to the modulators $P_{ij}$, $i=1, \ldots n$, and the phase shifts $\Delta\phi_{ij}$ thus resulting. They must be different for each of these N phase modulators and should be proportional to the vector component $T_i$, $i=1, \ldots, n$, so that one phase modulator exists for each component $T_i$ of the vector T, its constant $k_{ij}$ being proportional to the vector component $T_i$. When voltages $U_1, \ldots, U_n$ which are proportional to the integer components of the vector B are applied to all modulators $i=1, \ldots, n$ belonging to a module $M_j$, then the multiplication with the components of the vector T ensues due to the various weighting $k_{ij}, \ldots k_{nj}$ of the modulators:

$$\Delta\phi_{ij}=k_{ij}U_i \sim T_iB_i.$$

So that the modulators belonging to the various modules can respectively be driven with the same voltage $U_i$, the weightings $k_{ij}$ must be matched to the modules $M_j$. In the realization of such a phase modulator proceeding from FIG. 8, the proportionality constant $k_{ij}$ depends on the electrode geometry and can therefore be matched to the respective module $M_j$ via this geometry.

Due to the cyclical nature of the phase of a light wave and the aforementioned condition that the phase shift $2 \cdot \Delta\phi_o$ is achieved at that voltage corresponding to the maximum residue value, i.e. corresponding to the value of the allocated module, every phase modulator under consideration here automatically forms the residue related to the module $M_j$ for the products $k_{ij}U_i \sim B_iT_i$, $i=1, \ldots, n$. Thus, for the phase shifts effected by the individual phase modulators, $\Delta\phi_{ij}=Res_j(k_{ij}U_i) \sim Res_j(B_iT_i)$ is valid.

The binary classification contained in the phase modulator according to FIG. 8 which enables a vector component to be supplied as a binary number is particularly advantageous. A phase modulator in which both vector components could be supplied as binary numbers would be particularly expedient.

In a realization of such a phase modulator it is subdivided into a plurality of identical sub-modulators disposed behind one another in the propagation direction of the phase-modulatable light beam, each of the sub-modulators being designed like the modulator according to FIG. 8. One and the same binary number is applied to the switch elements 110 through 140 of each of the sub-modulators, said binary number corresponding to one of the two vector components. All switch elements 110 through 140 of each sub-modulator are connected to a constant voltage over a sub-modulator switch element unequivocally allocated in inverted fashion to the sub-modulator and can be engaged and disengaged via a binary signal. One respective sub-modulator switch element thus is provided for each sub-modulator, the sub-modulator being activatable via the switch element. When similar to the switch elements 110 through 140, a binary number in the form of a binary signal is applied parallel to the sub-modulator switch elements, then an overall phase shift is effected which corresponds to the product of the binary number present at the switch elements 110 through 140 of all sub-modulators and the binary number present at the sub-modulator switch elements. When the two binary numbers are selected equal to the numerical values of the vector components to be multiplied, then the overall phase shift of the phase modulator corresponds to this product.

For the practical realization of a proposed device for a large number of vector components, the phase modulators must be simple, cheap, efficient and capable of miniaturization, so that a large number of such modulators can be integrated on a shared carrier substrate.

The device illustrated in FIG. 7 is already a step in this direction. Given this device, for each module one first waveguide W11, W21 or W31 for conducting the allocated phase-modulatable light beam and a second waveguide W12, W22 or W32 for conducting the allocated reference beam are provided. Accordingly the phase modulators allocated to the corresponding module are disposed in each first waveguide.

Advantageously, the waveguides are planar waveguides consisting of a material whose refractive index is fieldstrength dependent. The first waveguides thus contain a material also suitable for the phase modulators.

The waveguides are aligned as closely together as possible. Thus not only a high packing density is achieved, but also a high phase stability for the light conducted in mutually allocated first and second waveguides, the light being subjected to interference.

For coupling the light deriving from a laser, for example, for each module into the mutually allocated first and second waveguides, waveguide branchers V1, V2, or V3 are provided.

Although various minor changes and modifications might be proposed by those skilled in the art, it will be understood that we wish to include within the claims of the patent warranted hereon all such changes and modifications as reasonably come within our contribution to the art.

We claim as our invention:

1. In a device for execution of a scalar multiplication of vectors, the improvement comprising:

an interferometric adder means for residue numbers formed of a plurality of modules, and wherein a respective phase-modulatable light beam is provided for each module intended for residue representation, said light beam producing an interference pattern in an allocated reference surface in the module with a reference beam allocated to a respective phase-modulatable light beam;

an angle of incidence relative to the reference surface of a phase-modulatable light beam and of the corresponding reference beam, or a wavelength of the pair of associated light beams being selected such that a strip spacing of the interference pattern produced by said light beam pair in the allocated reference surface corresponds to the module allocated to this light beam pair;

a plurality of series-connected vector-component-controlled phase modulator means disposed in each of the phase-modulatable light beams;

one phase modulator means being provided for each component of a vector;

the phase modulator means producing a phase shift as a function of components of the vectors to be multiplied which are supplied to it, said phase shift being proportional both to the components of the one as well as to the components of the other of the vectors to be multiplied; and the phase shift produced by each component amounting to $2\pi$ when a numerical value of said component is divisible by the allocated module without remainder;

whereby a result of the scalar multiplication may be obtained as a positionally notated number from the interference pattern or interference patterns generated after radiation has passed through the phase modulator means.

2. A device according to claim 1 wherein the phase modulator means has a material to be radiated through by the corresponding phase-modulated light beam which has a refractive index dependent on a field strength present, and further has a means for generating field strengths influencing the material as a function of numerical values of the vector components allocated to the phase modulator means.

3. A device according to claim 2 wherein the phase modulator means is subdivided into a plurality of identical sub-modulators disposed in series; each of these sub-modulators having a material to be radiated through by the corresponding phase-modulatable light beam having a refractive index dependent on a field strength and further having a respective sub-modulator for producing field strengths influencing the material as a function of the numerical values of a vector component identical for all individual modulators and allocated to the phase modulator means; and the sub-modulators for generating the field strengths all engageable and disengageable over a respective sub-modulator switch element controllable by a binary signal such that the sub-modulators for generating the field strengths are activatable in parallel in accordance with a binary number which corresponds to the numerical value of a different vector component allocated to the phase modulator means.

4. A device according to claim 3 wherein a voltage source means provided for the phase modulator means is a constant voltage source which is connected to the switch elements of the device for generating the field strengths of each sub-modulator over a respective sub-modulator switch element, whereby the binary number corresponding to the other vector component is respectively applied to the switch elements of each sub-modulator.

5. A device according to claim 2 wherein the means for generating the field strengths exhibits a plurality of separate elements generating respective field strengths as a function of the values of at least one vector component allocated to the phase modulator means.

6. A device according to claim 5 wherein the refractive index of the material depends on an electric field strength; and said separate elements are control electrode means for generating electric fields.

7. A device according to claim 6 wherein a plurality of separate electrodes are provided which, in addition to a shortest length $L_O$, exhibit all lengths of a series $2L_O$, $2^2L_O$, . . . $2^mL_O$; each of these control elements being connected to a voltage source over a respective switch element controllable by a binary signal such that a binary number can be applied in parallel to the switch elements, said binary number corresponding to a numerical value of a vector component allocated to the phase modulator means, and wherein a longest electrode is allocated to a most significant bit and a shortest electrode is allocated to a least significant bit of the binary number.

8. A device according to claim 5 wherein said separate elements have mutually different lengths in a propagation direction of the light beam.

9. A device according to claim 2 wherein a voltage source means provided for the phase modulator means is a variable voltage source which emits a voltage as a function of a different vector component allocated to the phase modulator means.

10. A device according to claim 2 wherein a respective first waveguide for conducting the allocated phase-modulatable light beam and a second waveguide for conducting the allocated reference beam are provided for each module; and the first waveguide contains material which is the same as that of the phase modulator means.

11. A device according to claim 10 wherein mutually allocated first and second waveguides are positioned in tight proximity.

* * * * *